US008625978B2

(12) United States Patent
Potier et al.

(10) Patent No.: US 8,625,978 B2
(45) Date of Patent: Jan. 7, 2014

(54) UREA TANK AND BASE PLATE WITH AN INTEGRATED HEATING ELEMENT

(75) Inventors: Vincent Potier, Brussels (BE); Stéphane Leonard, Brussels (BE); Joël Op De Beeck, Lint (BE); François Dougnier, Boortmeerbeek (BE); Nadia Walling, Margny-les-Compiègne (FR); Larry Tipton, Sterling Heights, MI (US); Volodia Naydenov, Louvain-la-Neuve (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 718 days.

(21) Appl. No.: 12/599,478

(22) PCT Filed: May 15, 2008

(86) PCT No.: PCT/EP2008/055936
§ 371 (c)(1),
(2), (4) Date: Mar. 5, 2010

(87) PCT Pub. No.: WO2008/138960
PCT Pub. Date: Nov. 20, 2008

(65) Prior Publication Data
US 2010/0220984 A1 Sep. 2, 2010

(30) Foreign Application Priority Data

May 16, 2007 (FR) ..................................... 07 55118
Jul. 20, 2007 (FR) ..................................... 07 56635

(51) Int. Cl.
*A47J 27/00* (2006.01)

(52) U.S. Cl.
USPC ............................................ 392/441; 392/447

(58) Field of Classification Search
USPC ........................................ 392/441, 442–464
See application file for complete search history.

(56) References Cited

U.S. PATENT DOCUMENTS

| 6,172,344 | B1 | 1/2001 | Gordon et al. |
| 6,216,755 | B1 | 4/2001 | Neufert |
| 7,268,325 | B1 | 9/2007 | Chuang |
| 7,313,322 | B2 * | 12/2007 | Starck et al. .................. 392/441 |

(Continued)

FOREIGN PATENT DOCUMENTS

| DE | 19834671 C1 | 2/2000 |
| DE | 10256727 A1 | 6/2004 |

(Continued)

OTHER PUBLICATIONS

[Unknown Author], MINCO Bulletin HS-202(B) "Thermofoil™ Heaters" from Minco Products Inc, copyright date of Oct. 30, 2002, retrieved online on Aug. 23, 2010 via http://www.temflexcontrols.com/pdf/hs202.pdf.

(Continued)

*Primary Examiner* — Thor Campbell
(74) *Attorney, Agent, or Firm* — Oblon, Spivak, McClelland, Maier & Neustadt, L.L.P.

(57) ABSTRACT

Urea tank and base plate with an integrated heating element in which the heating element comprises at least one flexible part which is preferably a flexible heater comprising at least one resistive track affixed to one flexible film and/or placed between two flexible films.

24 Claims, 4 Drawing Sheets

(56) References Cited

U.S. PATENT DOCUMENTS

Figure 1:
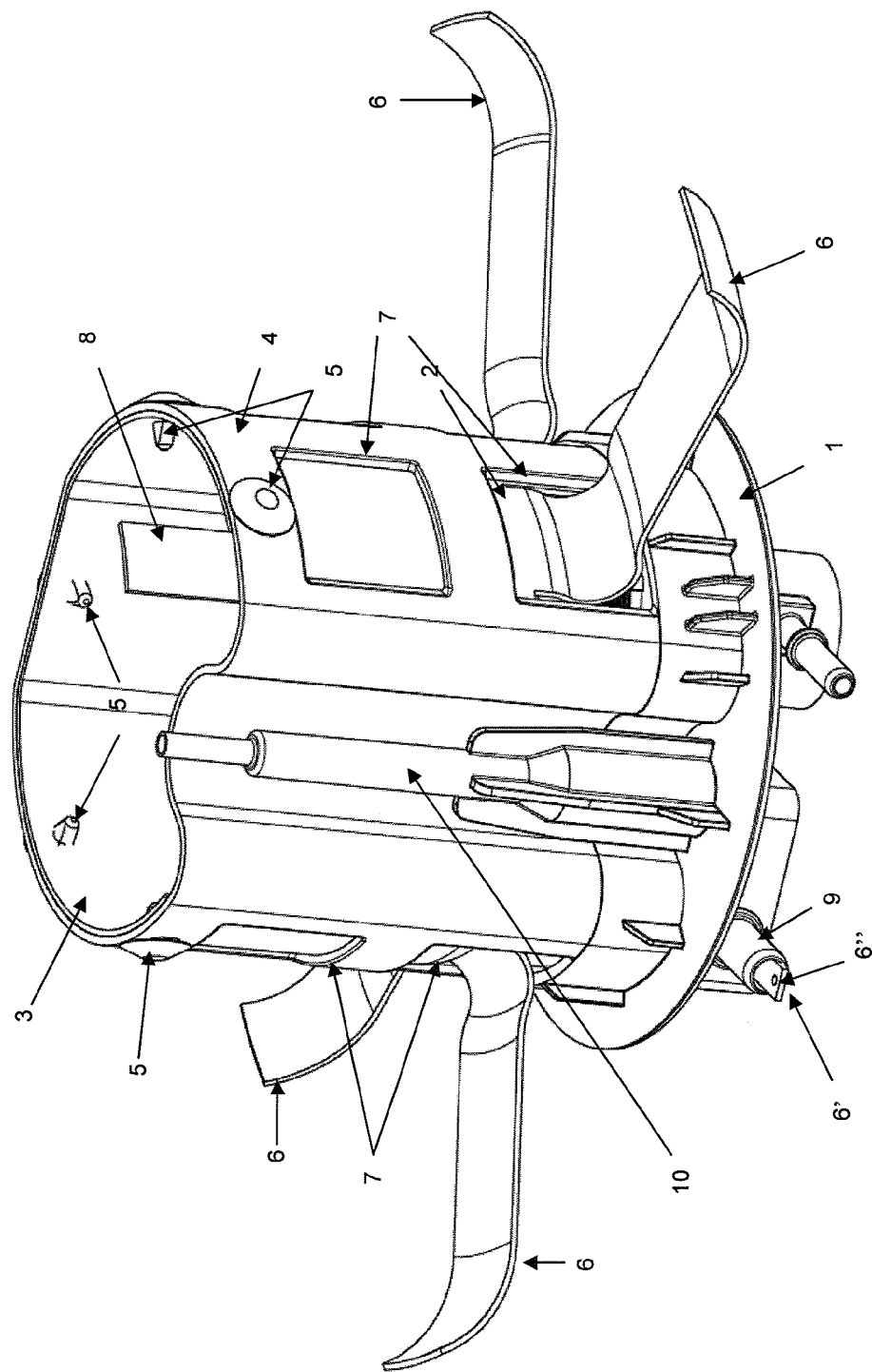

| | | | |
|---|---|---|---|
| 7,836,684 B2* | 11/2010 | Starck et al. | 60/286 |
| 8,184,964 B2* | 5/2012 | Haeberer et al. | 392/441 |
| 8,206,656 B2* | 6/2012 | Goebelbecker | 422/173 |
| 2006/0140598 A1* | 6/2006 | Starck et al. | 392/441 |
| 2011/0064394 A1* | 3/2011 | Bier et al. | 392/441 |

FOREIGN PATENT DOCUMENTS

| | | |
|---|---|---|
| EP | 1582732 A1 | 10/2005 |
| FR | 2905161 A1 | 2/2008 |
| JP | 53-69835 U | 6/1978 |
| JP | 1-267987 A | 10/1989 |
| JP | 2002-527660 A | 8/2002 |
| JP | 2005-155536 | 6/2005 |
| WO | WO 01/38704 A1 | 5/2001 |
| WO | WO 2008023021 A1 | 2/2008 |

OTHER PUBLICATIONS

DIN 70070(Aug. 2005) standard—Diesel engines NOx•Reduction agent AUS 32 Quality requirements —$_{1\ Aug.\ 2005}$—machine translation in English attached.

Office Action issued Nov. 27, 2012, in Japanese Patent Application No. 2010-507918 submitting English translation only.

* cited by examiner

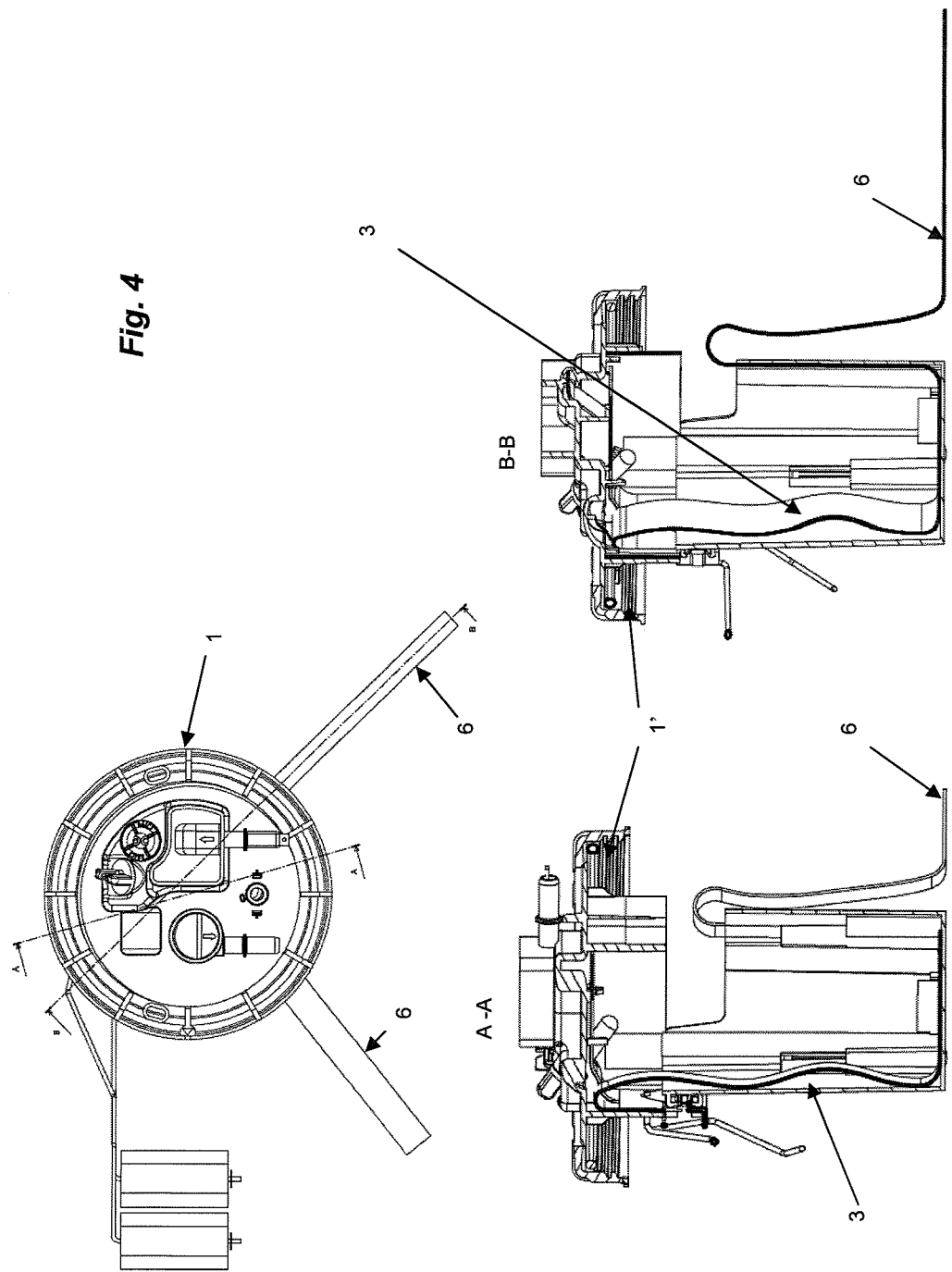

UREA TANK AND BASE PLATE WITH AN INTEGRATED HEATING ELEMENT

CROSS-REFERENCE TO RELATED APPLICATIONS

This application is a U.S. national stage application under 35 U.S.C. §371 of International Application No. PCT/EP2008/055936 filed May 15, 2008, which claims priority to French Application No. 0755118 filed May 16, 2007 and to French Application No. 0756635 filed Jul. 20, 2007, these applications being incorporated herein by reference in their entirety for all purposes.

The present application relates to a urea tank with an integrated heating element, and also to a base plate intended for such a tank and that integrates the heating element.

Legislation on vehicle and heavy goods vehicle emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also a device for metering the desired amount of additive and injecting it into the exhaust line.

Given that the aqueous urea solution generally used for this purpose (eutectic 32.5 wt % urea solution) freezes at −11° C., it is necessary to provide a heating device to liquefy the solution in order to be able to inject it into the exhaust line in the event of starting in freezing conditions.

Several systems have been provided in the prior art for this purpose. Generally, these systems comprise relatively expensive heating devices that involve either specific heating elements or a bypass of the engine cooling circuit (for example, see Application WO 2006/064001 in the name of the Applicant).

As regards the use of specific heating elements, it is known to put heating tubes inside the tank containing the urea solution, and optionally in the urea (feed and return, if necessary) lines. However, these tubes have a minimum diameter of several mm which makes them difficult to bend and compromises their insertion into certain parts.

One currently known alternative concerns the insertion of cartridge (rod) heaters at various locations in the tank. Although these cartridges (rods) may be mobile (articulated) relative to one another, the same problem exists as regards the flexibility of these cartridges.

Thus, the Applicant has observed that a problem arises at the connections of the urea lines to the tank. This is because a plug of ice (frozen solution) tends to form in them, and given that they are generally injection-moulded parts made of plastic of a certain thickness, heating via an external heating tube is not effective. However, these connections are generally formed from thin parts (otherwise known as "delivery tubes") into which a heating tube cannot easily be inserted.

Application FR 06/07531 in the name of the Applicant aims to solve this specific problem by providing a hollow connection equipped, since its manufacture, with an integrated heating filament, at least one part of which extends freely inside the passage provided for the liquid. Such an arrangement makes it possible to ensure that the liquid is in direct contact with a large heating surface area, and therefore to heat it rapidly.

However, this is an arrangement specific to heating this location (connection), said filament possibly not easily being used to heat the whole of the tank. Moreover, it cannot easily be inserted into other accessories, considering its reduced flexibility.

The present invention especially aims to solve this problem by providing a liquid tank equipped internally with a particular heater, the flexibility, shape and heating power of which may easily be adapted to any geometry of the tank or of its accessories.

Therefore, the present application relates to a urea tank with an integrated heating element in which said heating element comprises at least one flexible heating part (that is to say, equipped with a device enabling it to heat up, such as a resistive element for example). Preferably, this flexible part is a flexible heater, that is to say that it comprises at least one resistive track inserted between two flexible films or affixed to a flexible film (for example, see U.S. Pat. No. 7,268,325 which describes such heaters and their methods of manufacture). Most particularly preferably, the heating element is predominantly composed of a flexible heater.

Although such "flexible heaters" have been commercially available for many years, to date no one has considered their use in urea tanks, this being the case even though the use of this type of heater in the urea application has many advantages which will be explained in detail later on.

The term "urea" is understood to mean any, generally aqueous, solution containing urea. The invention gives good results with eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the Adblue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

The urea tank according to the invention may be made from any material, preferably one that is chemically resistant to urea. In general, this is metal or plastic. Polyolefins, in particular polyethylene (and more particularly HDPE or high-density polyethylene), constitute preferred materials.

This tank may be produced by any conversion processes known in the case of hollow bodies. One preferred processing method, in particular when the tank is made of plastic, and in particular HDPE, is the extrusion-blow moulding process. In this case a parison (in one or more parts) is obtained by extrusion, and is then shaped by blow moulding in a mould. One-part moulding of the tank from a single parison gives good results.

This tank is advantageously equipped with a base plate or mounting plate (that is to say a support having substantially the shape of a plate) onto which at least one active accessory of the urea storage system and/or injection system is attached. This base plate generally has a perimeter, closed up on itself, of any shape. Usually, its perimeter has a circular shape.

In a particularly preferred manner, this base plate is a submerged mounting plate, i.e. that seals an opening in the lower wall of the tank. The expression "lower wall" is in fact understood to mean the lower half of the tank (whether or not it is moulded in one piece or from two parison sheets or cut-outs). Preferably, the base plate is located in the lower third of the tank, and more particularly preferably, in the lower quarter, or even squarely in the bottom of the tank. It may be partly on the lower side wall, in which case it is slightly slanted once mounted in the vehicle. The location and/or direction of the base plate especially depends on the location of the tank in the vehicle, and on the space occupied around it (considering the components to be integrated therein).

This base plate therefore incorporates at least one component that is active during storage and/or injection. This is understood to mean that the component is attached to or produced as one part with the base plate. This component may be incorporated inside the tank, or on the outside with, if necessary, a connection (delivery tube) passing through it.

Preferably, the base plate according to this variant of the invention integrates several active storage and/or metering components and, more particularly preferably, it integrates all the active components which are brought to be in contact with the liquid additive found in, leaving from or arriving into the additive tank.

Preferably, the component is chosen from the following elements: a pump; a level gauge; a temperature sensor; a quality sensor; a pressure sensor and a pressure regulator. These elements each have an active role in the additive storage and/or injection system, and the fact of integrating them into a mounting plate that is "submerged" (that is to say, always in the presence of the additive, as long as the tank is not empty) has specific advantages:

for the level gauge: the low point is better defined and therefore the measurement is less affected by deformations of the tank;

for the sensors of temperature, quality or other characteristic(s) of the additive: makes it possible to easily locate it in the critical zone for feeding to the injection system.

The level gauge may be of any type. Preferably, it is a gauge with no moving parts, for example of the capacitive type.

The base plate of the tank according to this variant of the invention may be obtained by any known means, but as a preference it is obtained by injection moulding, this method making it possible to obtain good dimensional accuracy.

Preferably, the base plate is based on a material that is resistant to urea and to the products created during ageing of the latter, such as polyacetal, and in particular POM (polyoxymethylene); polyphthalamides (for example, AMODEL® grades); or polyamides, and in particular grades of polyamides that are reinforced (for example with glass fibres). Preferably, the base plate is made of polyamide and it comprises a delivery tube moulded as one piece with it as described previously.

The tank according to the invention incorporates (that is to say, is equipped with) a heating element having at least one flexible part. The qualifier "flexible" is in fact understood to mean "easily deformable", this generally being in a reversible manner. Generally, this corresponds to a flexural rigidity (defined as being equal to $(Eh^3)/(12(1-v^2))$ where E is the Young's modulus of the flexible part measured according to the ASTM D790-03 standard, h is its thickness and v is the Poisson's ratio of its constituent material) below 4000 N.m; preferably, in the context of the invention, the rigidity of the flexible part is less than or equal to 1000 N.m, or 100 N.m or even 10 N.m and most particularly preferably, less than or equal to 1 N.m.

Preferably, this flexible part is a flexible heater, that is to say a heater comprising one or more resistive track(s) affixed to a film or placed between two films (that is to say two substantially flat supports, the material and thickness of which are such that they are flexible). This film is preferably made of a plastic (although any other insulating material may be suitable) and, in particular, is based on an elastomer. For ease, reference will subsequently generally be made to several resistive tracks. In this variant, for the flexural rigidity calculation defined above, the Poisson's ratio will preferably be taken to be that of the constituent material of the film or films.

The resistive tracks may be based on metal, carbon, etc. or even a combination of such conductive materials. They are generally metallic (and most particularly preferably, made of a urea-resistant metal such as a stainless steel). They are generally sandwiched between two flexible films. They are applied (for example, by jet printing techniques) onto a flexible film and then covered with another flexible film or overmoulded using an insulating (preferably elastomeric) material. The two films are then firmly attached together (for example, by vulcanization) to ensure sealing around the resistive tracks. These tracks are preferably connected in parallel so that if one of the tracks is damaged, it does not impede the operation of the other tracks.

The flexible films may be made of silicone resin, polyolefin (polyethylene or polypropylene), thermoplastic elastomer (or TPE), polyester, polyimide (such as the KAPTON®resin), etc. Preferably, they are based on silicone, polyolefin or TPE considering the fact that polyester and polyimide have a lower resistance to urea, particularly at high temperature.

The flexible films may also comprise several superposed layers of resistors (resistive tracks). They may also comprise a glass-fibre coating to improve their mechanical strength.

Stainless steel resistive tracks sandwiched between two silicone resin films, one of which is covered with a network of glass fibres, give good results in the context of the invention.

With a view to avoiding the problems of overheating which may occur when the heater cannot dissipate its power by conduction and which may lead to the degradation of the heater and/or urea, it may be advantageous to locally control its specific power, that is to say to locally vary the power loss per unit area of resistive track by altering the length and width of the resistive track. For example, if the width and length of a resistive track applied to a given surface are doubled, its total resistance and the power dissipated by this track will remain unchanged. On the other hand, the total surface area of the track will be multiplied by 4, leading to a specific power (or power loss per unit area of track) divided by 4. This therefore results in a lower track temperature at this location.

One advantage of flexible heaters is that, due to their flexibility, they can easily be inserted into cavities of any shape and while substantially conforming to the walls, even when following a tortuous path. Furthermore, they may have any shape, possibly even a complicated shape, so that a single heater (designed according to a sort of "pattern") may be used to heat various parts of the tank, even parts that are distant from one another. Thus, in one preferred variant, the flexible heater comprises a body and at least one excrescence or tentacle equipped with at least one part of resistive track.

Most particularly preferably, it comprises several excrescences or tentacles which are positioned uniformly in the tank so as to be able to heat its contents completely and as homogeneously as possible, even in the nooks distant from the body of the heater from which the tentacles extend. In this variant, the body of the heater may comprise a resistive track and tentacles, at least one other resistive track, these tracks preferably being connected in parallel to a power supply terminal.

The term "body" is understood to mean a part of the heater where the tentacles start from or where the resistive tracks start from and arrive at. The abovementioned tentacles may be obtained in any known manner. Advantageously, they are the product of cuts made in the heater itself without interrupting the resistive track or tracks. One particular way of proceeding consists in placing the resistive tracks onto a silicone film according to a preestablished pattern; in covering the tracks with a second silicone film; and finally in carrying out the aforementioned cuts.

According to the invention, the flexible heater is located inside the urea tank, and is therefore submerged (partially or completely) in the urea (liquid phase) when the tank is full. Preferably, this heater is positioned so as to be able to heat the urea even when the tank is almost empty. For this purpose, it is advantageous for at least one tentacle to have a sufficient length so that it can rest on the bottom of the tank. One variant with free flexible tentacle(s) (i.e. ones that are not attached to the tank) has the advantage that the flexible heater assembly and its support may be suitable for many different urea tank designs since the tentacles may be folded up inside these tanks and adapt to their various shapes.

As mentioned above, the flexible heater according to the invention is preferably affixed to a support (preferably one that is rigid, i.e. can not be deformed very much) which also has a protective role towards said heater (and/or certain tank accessories). Generally, the body of the heater is attached to the support and the tentacles are either free or attached to certain tank parts or accessories.

This support may be any part that may or may not fulfil another role in the tank. Advantageously, this support is integrated into (produced from a single part with or attached onto) a base plate such as described above. Preferably, this is a submerged base plate such as defined above which makes it possible to do without withdrawing line(s) (that connect said base plate and the bottom of the tank) which must be heated, where appropriate. Alternatively, it might be a conventional base plate placed on the upper wall of the tank, but in this case it is necessary to heat the lines and also to provide a sufficient length (of the tentacles, where appropriate) to be able to heat the bottom of the tank.

Preferably, the support and the base plate are produced from a single piece by injection moulding of plastic such as described above.

The support may have any shape. Advantageously, it has a substantially cylindrical shape and extends substantially over the entire height of the tank. The term "substantially" is in fact understood to mean that it extends over the entire height generally to within a few mm (or even 1 to 2 cm), this being so as to take into account manufacturing tolerances and/or thermal expansions. Therefore, in the case of freezing, there is a risk of forming a layer of ice that cannot be heated in this zone, associated with which is a risk of the injection system stopping following the vacuum created under this ice layer and which prevents the urea from being pumped.

Therefore, it is advantageous to provide the heater with at least one flexible tab comprising at least one part of resistive track, and of which the location, size and shape are such that this tab is permanently in contact with the upper wall of the tank so as to pierce a shaft in the ice layer described previously.

It should be noted that this concept of a heating element permanently in contact with the upper wall of the tank is also advantageous outside the context of the invention, with any type of heater and/or liquid that is capable of freezing in its storage tank where it is withdrawn by pumping.

Preferably, the heater support delimits a volume (closed or open) inside which at least one part of the flexible heater is attached. In the advantageous variant with tentacles, the body of the heater is attached in this volume and the tentacles extend at least partly outside this volume.

In one variant, this volume is closed, that is to say is delimited by a substantially solid side wall that acts as a urea trap (ensuring a minimum volume of liquid urea under all usage conditions). In this variant, it is particularly advantageous that the trap be integrated into a submerged base plate, that is to say be produced from one piece with (or attached to) this base plate, which avoids having to heat a line connecting these two components. The term "substantially solid" is understood to mean that this wall may comprise orifices, but these are then in an upper part so as to be able to trap urea in its lower part.

In this case, if the heater is equipped with tentacles, the latter preferably extend into the tank from the upper edge of the trap (which is itself generally open).

Alternatively, the support may comprise a sort of box comprising openings which make it possible to create convection loops that facilitate heating of the urea. Some of these openings are advantageously used to allow the tentacles to extend towards the bottom of the tank. It should be noted that this convection is also promoted by the movements of the urea.

It should be noted that these 2 variants (urea trap and convection box) may be combined (as a trap with orifices in its upper part as mentioned previously).

In particular, when the tentacles extend from the top of the support, there is a risk that the free end of certain tentacles floats, or even that it extends into the gas phase which must not be heated. To avoid this, it is advantageous to provide a sort of float that is firmly attached to these ends and that forces them to remain in the liquid phase.

The principle of the float may be generalized to all shapes of flexible heaters: attaching the "rising" part(s) of the heater to a (some) float(s) makes it possible to ensure that the heater always remains under this (these) float(s) and therefore submerged, which avoids heating the vapour zone located above the liquid urea.

The heater is preferably attached to its support mechanically using clips, rivets, bolts, etc. that pass through orifices made for this purpose both in the heater and in its support. Other orifices may be made in the heater, for example to provide an entry for probes.

At least one of the aforementioned tentacles is advantageously sized so as to be able to be inserted into a tube (in particular, a small-diameter tube), for example into a delivery tube for connection to the abovementioned urea injection circuit. Preferably, at least two tentacles are provided in order to be inserted into the urea supply and return tubes, respectively. Most particularly preferably, the end of this (these) tentacle(s) is equipped with a relief that makes it possible to get hold of it and pull it through the tube/delivery tube. One relief which is particularly suitable is a simple orifice through which a hook may be inserted.

According to one particularly advantageous variant of the invention, the heater is designed so as to be able to follow the entire hydraulic path of the urea, that is to say to extend from the filling interface of the tank to the delivery tube for connection to the injection system, passing through the filter, where appropriate, the venturi, the gauge or even the pump. Thus, according to one advantageous variant of the invention, a single heater heats the whole of the tank and its accessories. This has the advantage of limiting the electrical connections, as explained previously.

Independently of the context of the invention then (that is to say with any type of heater and/or liquid capable of freezing), it is advantageous to provide a heater at the filling interface (pipe) since plugs of ice are capable of being formed at this location and of preventing the tank from being filled in the event of freezing. Therefore, the heater according to the invention preferably comprises at least one tentacle that extends at least partly into a filling interface of the tank.

As regards the particular case of heating the filter, it should be noted that the latter is generally manufactured separately and inserted into the urea injection circuit (that is to say connected to a line that forms part of this circuit), generally at the base plate, by a simple leaktight mechanical attachment involving a seal. Therefore, the flexible heater cannot be inserted into the zone downstream of the filter due to the risk of impairing the impermeability.

A $1^{st}$ method of solving this problem consists in providing a by-pass in this zone (where the seal is), that is to say providing an additional tube that has an inlet orifice for the heating element just before the filter and an outlet orifice for this element just after the filter. This solution is, however, complicated since it is imperative that this additional tube is rendered leaktight around the heater in order to prevent the urea from by-passing the filter.

Therefore, a preferred solution consists in overmoulding the seal onto the heating element before assembling said heating element in the tank and before connecting the filter. Again, this solution is also advantageous outside the context of the invention, for example with a filament-type heating element and/or a liquid other than urea.

In the advantageous variant described previously, according to which the heater comprises at least one resistive track inserted between two flexible films or affixed to one flexible film, one particularly advantageous variant consists in providing at least 2 tracks which may be connected in parallel in order to form a capacitive gauge that makes it possible to measure the level of urea in the tank. These tracks generally have a low resistance and participate little in the heating effect of the heater.

In one variant, 4 such tracks may be provided so as to form, in pairs, a reference capacitor and a measurement capacitor respectively. Preferably, these tracks are positioned in such a way that the reference capacitor is submerged in the urea as soon as there is some (be this only a little) in the tank (which amounts to saying that it is preferably located on the bottom of the tank) and in such a way that the measurement capacitor covers the entire height of the tank in the measurement zone.

Given the specificity of the heating and level measurement tracks respectively, it is advantageous that their respective widths and also the thickness of the surface film, where appropriate, are adapted. Generally, the measurement tracks are thinner and are covered with a film of lesser thickness. The two types of tracks may be produced from stainless steel (preferably from a grade which has a substantially higher urea resistance than that of Cu for example), be affixed to a common silicone film that has a sufficient thickness to act as a support; and comprise a coating also based on silicone resin, which is thinner on the measurement tracks (e.g. around 100 μm) than on the heating tracks (where the thickness may reach 1 mm).

Although described in the context of the present invention (heating and level measurement in a urea tank), it is obvious that the flexible heater described above is also suitable for other types of tanks since it allows the saving of a gauge regardless of the liquid for which the tank is intended.

The present invention also relates to a base plate such as described previously, that is to say that integrates at least one active accessory of the urea storage system and/or injection system and, in the context of the invention, that integrates at least one heating element having a flexible part preferably consisting of a flexible heater (and preferably one only, but designed and positioned so as to be able to heat the whole of the tank and the accessories integrated into it).

All the preferred variants relating to the flexible heaters and to the base plates mentioned previously apply to this aspect of the invention, especially:

the fact that the heater may comprise several resistive tracks preferably connected in parallel;

the fact that it is preferably equipped with tentacles, of which some are free to extend into the tank and others are equipped with orifices enabling them to be inserted more easily into a line, delivery tube, etc.; and/or that the support for heating it can act as a fuel trap and/or a convection box.

The present invention is illustrated nonlimitingly by the appended FIGS. 1 to 4.

FIG. 1 consists of a 3-dimensional view of a base plate with a flexible heater illustrating several variants of the invention.

Figure 2:
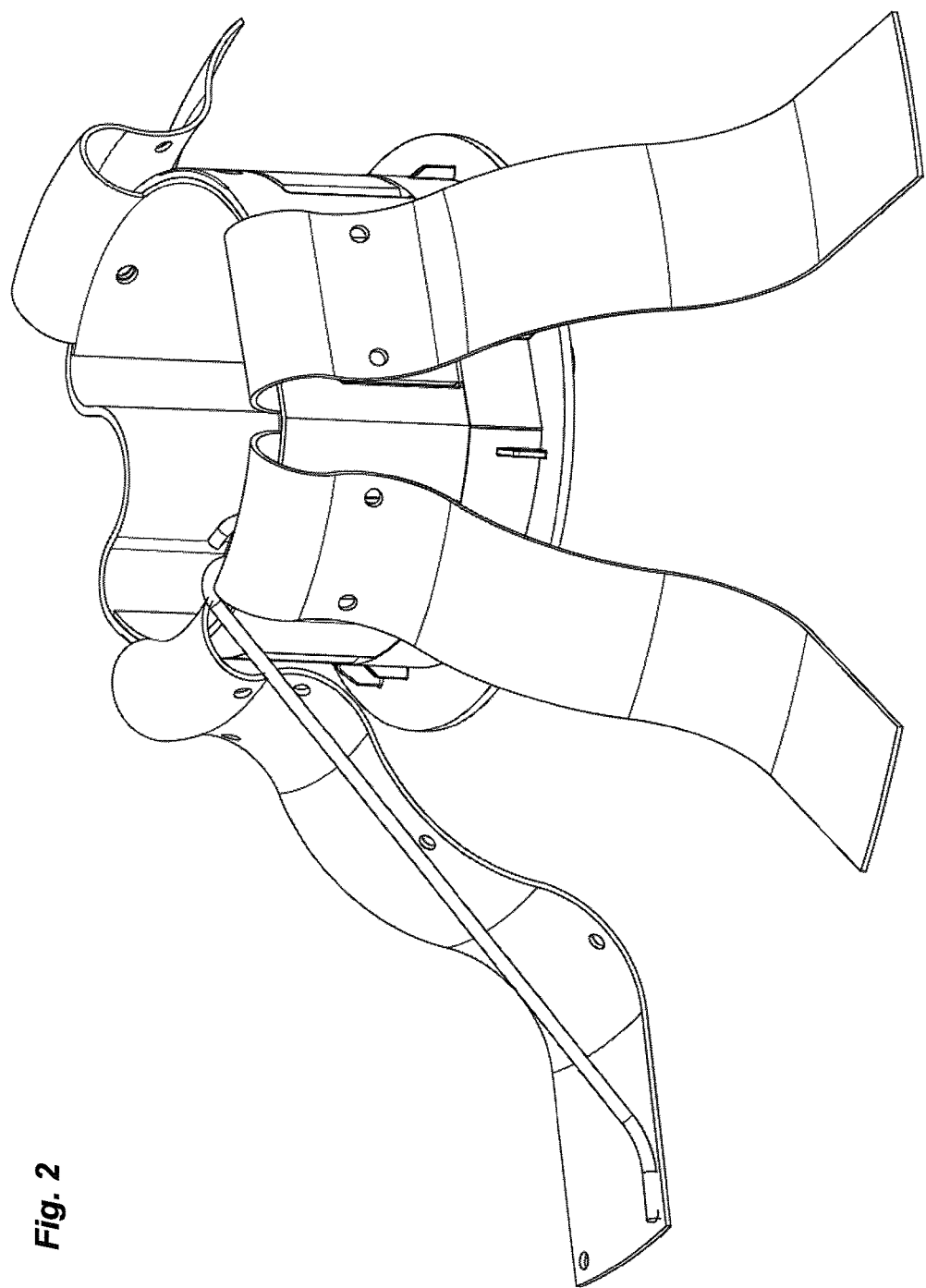

FIG. 2 consists of a 3-dimensional view of another base plate with a flexible heater also illustrating several variants of the invention.

Figure 3:
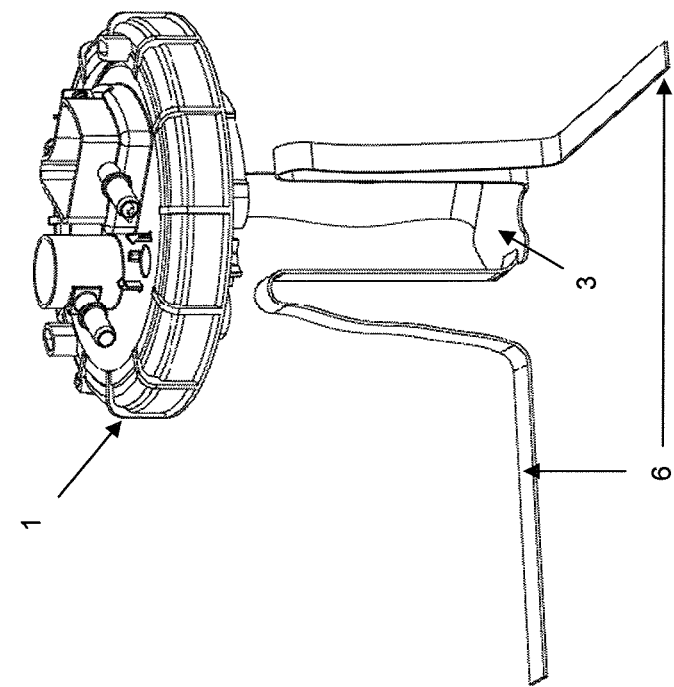
Figure 3:
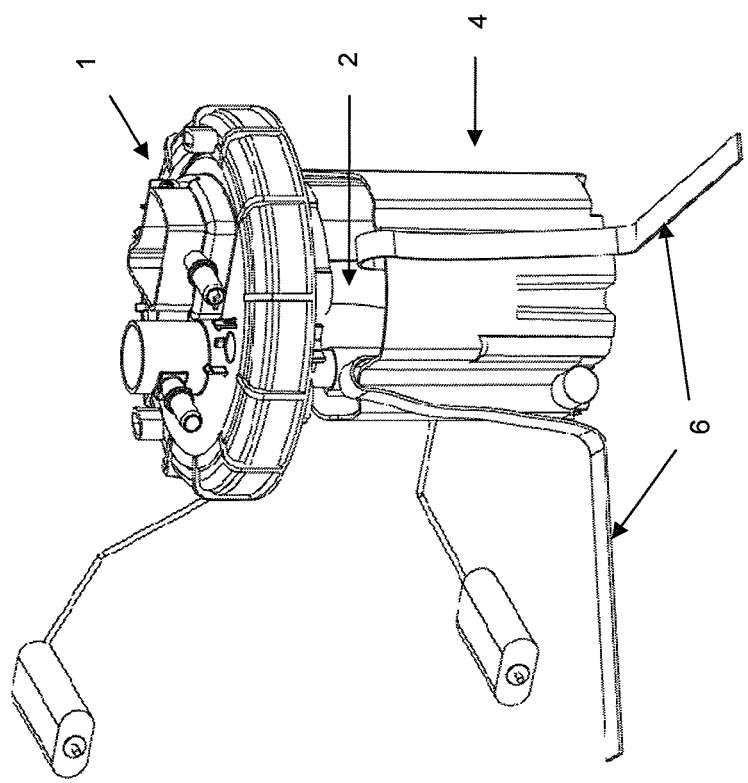

FIG. 3 consists of two 3-dimensional views of a base plate with a flexible heater according to yet another variant of the invention. In FIG. 3*b*, the urea trap has been deliberately erased in order to see the shape of the heater in it.

FIG. 4 illustrates a top view and two cross sections through this same base plate.

In the figures identical numbers denote identical or similar components.

The base plate (1) illustrated in FIG. 1 integrates a flexible heater (2) comprising a body (3) fixed to the inside of a support (4) using clips (5) and tentacles (6) connected to the body (3) and having a free end capable of extending inside a urea tank (not represented).

The support (4) of the heater (2) comprises openings (7) that make it possible to create convection loops and to allow the free end of the tentacles (6) to pass through.

The heater comprises a tab (8) intended to be in permanent contact with the upper wall of the tank to create a shaft through the cap (layer) of ice as explained previously.

It also comprises a tentacle (6') specially sized to be able to be inserted into a delivery tube (9) for connection to the urea injection system (not represented).

The base plate (1) incorporates a gauge (10) for measuring the level of urea in the tank, and also other accessories which do not appear clearly in this figure, such as a temperature sensor, a filter, etc.

One of them is firmly attached at its end to a tube (11) connected to a venturi (not represented) and enabling liquid to be sucked up outside of the support (4) in order to fill the latter. In this variant, the support (4) is free from orifices and acts as a liquid (urea) trap.

The base plate (1) illustrated in FIGS. 3 and 4 is, on the other hand, a base plate intended to seal an orifice in the upper wall of a tank. For this purpose it is equipped with a screw thread (1') (visible in the cross sections from FIG. 4) able to cooperate with a complementary screw thread on an excrescence of the tank.

This base plate (1) also incorporates a support (4) for a flexible heater (2) acting as a urea trap. This support (4) is attached to the base plate (as can be seen in the cross sections from FIG. 4) and is pinned to the bottom of the tank by at least one spring (not represented).

The heater (2) is attached to the base plate (1) and to the bottom of the support (4).

The flexibility of the heater (2) enables it to adapt to the various compression ratios of the spring that depend on the distance between the top and bottom of the tank.

The invention claimed is:

1. A urea tank with an integrated heating element in which said heating element comprises at least one flexible heating part which is a flexible heater comprising at least one resistive track affixed to a flexible film.

2. The urea tank according to claim 1, wherein the flexible heater comprises several resistive tracks connected in parallel.

3. A urea tank with an integrated heating element in which said heating element comprises at least one flexible heating part which is a flexible heater comprising at least one resistive track affixed to a flexible film, wherein the flexible heater comprises one or more stainless steel resistive track(s) sandwiched between two silicone resin films, one of which is covered with a network of glass fibers.

4. The urea tank according to anyone of claim 1, wherein the flexible heater has a variable power loss per unit area of resistive track.

5. The urea tank according to claim 1, wherein the flexible heater is equipped with at least one tentacle comprising at least one part of resistive track.

6. The urea tank according to claim 5, wherein the tentacle has a free end and a sufficient length so that this end is able to rest on the bottom of the tank.

7. The urea tank according to claim 1, wherein the flexible heater is affixed to a support integrated into a base plate that integrates at least one active accessory of the tank and/or of a urea injection system.

8. The urea tank according to claim 7, wherein the support has a substantially cylindrical shape and extends substantially over the entire height of the tank.

9. The urea tank according to claim 8, wherein the flexible heater comprises at least one flexible tab equipped with at least one part of resistive track, which is permanently in contact with the upper wall of the tank.

10. The urea tank according to claim 8, wherein the support delimits a volume inside which at least one part of the flexible heater is attached.

11. The urea tank according to claim 10, wherein this volume is closed, that is to say delimited, by a substantially solid side wall that acts as a urea trap.

12. The urea tank according to claim 10, wherein the support comprises openings that make it possible to create convection loops that facilitate the heating of the urea.

13. The urea tank according to claim 5, wherein at least one tentacle has a free end that is firmly attached to a float, forcing such tentacle to remain in the liquid phase.

14. The urea tank according to claim 5, wherein at least one tentacle is sized so as to be able to be inserted into a tube and wherein this tentacle comprises a free end equipped with an orifice.

15. The urea tank according to claim 5, wherein at least one tentacle extends at least partly into a filling interface of the tank.

16. A urea tank with an integrated heating element in which said heating element comprises at least one flexible heating part which is a flexible heater comprising at least one resistive track affixed to a flexible film, comprising a filter connected to a line inside which a part of the flexible heater is inserted, the filter being connected thereto by an impermeable mechanical attachment involving a seal.

17. The urea tank according to claim 16, wherein the zone where the seal is located is by-passed by the heater.

18. The urea tank according to claim 16, wherein the seal is overmoulded onto the flexible heater before the flexible heater is attached to the tank and before the filter is connected.

19. The urea tank according to claim 1, wherein the flexible heater comprises at least two tracks which are able to be connected in parallel to form a capacitive gauge that makes it possible to measure the level of urea in the tank.

20. A base plate suitable for the urea tank according to claim 1 that integrates at least one active accessory of a urea storage system and/or injection system and also at least one heating element having at least one flexible heating part, wherein the flexible heating part is a flexible heater comprising at least one resistive track affixed to a flexible film and which:
   comprises several resistive tracks connected in parallel;
   is equipped with tentacles, of which some are free to extend into the tank and others are equipped with orifices enabling them to be inserted more easily into a delivery tube or a line; or
   is affixed to a support capable of acting as a fuel trap and/or a convection box.

21. The urea tank according to claim 1, wherein the at least one resistive track is placed between two flexible films.

22. The urea tank according to claim 3, wherein the at least one resistive track is placed between two flexible films.

23. The urea tank according to claim 16, wherein the at least one resistive track is placed between two flexible films.

24. A base plate suitable for the urea tank according to claim 1 that integrates at least one active accessory of a urea storage system and/or injection system and also at least one heating element having at least one flexible heating part, wherein the flexible heating part is a flexible heater comprising at least one resistive track placed between two flexible films and which:
   comprises several resistive tracks connected in parallel;
   is equipped with tentacles, of which some are free to extend into the tank and others are equipped with orifices enabling them to be inserted more easily into a delivery tube or a line; or
   is affixed to a support capable of acting as a fuel trap and/or a convection box.

* * * * *

UNITED STATES PATENT AND TRADEMARK OFFICE
CERTIFICATE OF CORRECTION

PATENT NO. : 8,625,978 B2  
APPLICATION NO. : 12/599478  
DATED : January 7, 2014  
INVENTOR(S) : Vincent Potier et al.

Page 1 of 1

It is certified that error appears in the above-identified patent and that said Letters Patent is hereby corrected as shown below:

Title Page: (75) Inventors: change "Nadia Walling" to --Nadja Walling--.

Signed and Sealed this  
Twenty-second Day of July, 2014

Michelle K. Lee  
*Deputy Director of the United States Patent and Trademark Office*